United States Patent [19]
Benz

[11] Patent Number: 5,339,606
[45] Date of Patent: Aug. 23, 1994

[54] METHOD FOR ACCEPTING CONTINUOUSLY SUPPLIED PRODUCTS FROM A PRODUCTION FACILITY AND RESPECTIVELY DISCONTINUOUS DELIVERY OF A NUMBER OF THESE PRODUCTS AT A DELIVERY STATION

[75] Inventor: Gottlieb Benz, Flums, Switzerland
[73] Assignee: Pamag AG, Switzerland
[21] Appl. No.: 976,925
[22] Filed: Nov. 17, 1992
[51] Int. Cl.$^5$ ............................................. B65B 19/34
[52] U.S. Cl. .......................................... 53/444; 53/150; 53/251; 53/537
[58] Field of Search ................. 53/150, 149, 537, 535, 53/536, 252, 251, 250, 249, 444, 443

[56] References Cited
U.S. PATENT DOCUMENTS

| | | | |
|---|---|---|---|
| 3,089,297 | 5/1963 | Craig et al. | 53/537 X |
| 3,455,085 | 7/1969 | McIntyre | 53/537 X |
| 3,902,587 | 9/1975 | Checcucci | 53/537 X |
| 4,079,569 | 3/1978 | Molins | 53/150 X |
| 4,083,460 | 4/1978 | Venturi | 53/150 X |
| 4,854,111 | 8/1989 | Roberts et al. | 53/537 |
| 5,060,454 | 10/1991 | Benz | 53/537 X |

Primary Examiner—James F. Coan
Attorney, Agent, or Firm—Speckman, Pauley & Fejer

[57] ABSTRACT

A method for discontinuous delivery of products, such as tubes or capsules supplied continuously by a production facility to a delivery station of a machine. A box-filling installation, for example, is located at the delivery station. The machine has two carriages guided along the same path. While the first carriage which is moved in steps is loaded at the transfer station, the second carriage is already at the delivery station, where it is unloaded and subsequently rapidly moved on until it again abuts the carriage. Thus, loading of the carriages at the transfer station can take place continuously. So that the carriages can perform the movement cycles, such as step-by-step movement, driving, stopping, rapidly moving on until connection with the other carriage, independently of each other, an individual drive is provided for each one of the two carriages.

7 Claims, 3 Drawing Sheets

METHOD FOR ACCEPTING CONTINUOUSLY SUPPLIED PRODUCTS FROM A PRODUCTION FACILITY AND RESPECTIVELY DISCONTINUOUS DELIVERY OF A NUMBER OF THESE PRODUCTS AT A DELIVERY STATION

BACKGROUND OF THE INVENTION

1. Field of the Invention

This invention relates to a method for accepting continuously supplied products from a production facility and respectively discontinuous delivery of a number of these products at a delivery station. This invention also relates to the machine used to execute the method.

2. Description of Prior Art

Methods of this type are employed when it is necessary to package products, which are continuously supplied by a production facility, in an orderly manner. If, for example, the production facility produces delicate products, such as empty capsules or tubes, they must be carefully packaged when forwarded to the company which fills them. The difficulty with the conventional art is that the continuously delivered flow of products must be stopped at a delivery and packaging station. The delicate products must be handled as carefully as possible during this and shock forces must be avoided.

In a known method taught by U.S. Pat. No. 5,060,454, a compensation device is positioned between a continuous supply and discontinuous delivery position, which continuously accepts the steadily arriving products and delivers them discontinuously. This is accomplished with a loop of a closed conveyor extending between the acceptance and delivery positions, which can be lengthened or shortened.

Although such a compensating device provides somewhat careful handling of the products, it represents considerably greater cost for the installation.

SUMMARY OF THE INVENTION

It is one object of this invention to provide a method assuring careful handling of delicate products, without the use of a compensating device.

This and other objects are achieved with a method that uses a transport carriage which moves in steps and is filled with the products at a transfer station. A second transport carriage abuts against the first transport carriage and is then filled with the products. In the period of time required for filling the second transport carriage, the first transport carriage is moved to a delivery station and is stopped there during an unloading process. The first carriage is then moved until it directly abuts the second transport carriage which is being filled. The cycle is then repeated.

Capsules or tubes can be packaged in boxes, according to one preferred embodiment of the method of this invention. A box is positioned at the delivery station of a box-filling installation. A pusher moves or pushes a layer of capsules or tubes and the box is lowered by a height of the layer once the layer is pushed into position. In another preferred embodiment of this invention, two parallel endless chain drives each have an individual drive device which conveys an associated transport carriage.

A machine for executing the method of this invention is shown schematically in the attached drawings in the form of a machine for packaging tubes in packages.

DESCRIPTION OF PREFERRED EMBODIMENTS

Figure 1:
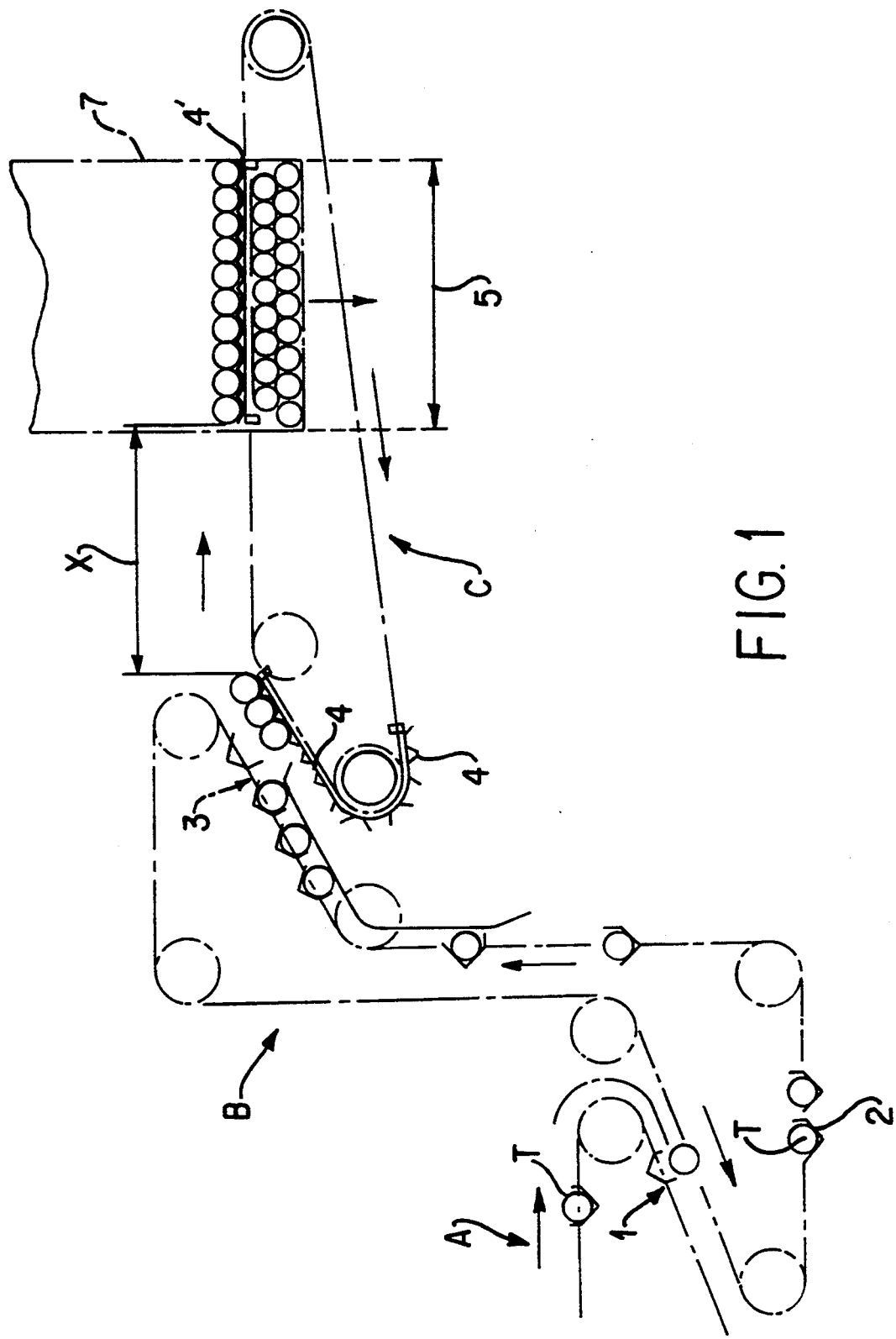
FIG. 1 is a schematic view of a machine which discontinuously delivers tubes continuously supplied by a production facility at a delivery position having a filling device for packages, according to one preferred embodiment of this invention.

For better understanding of this invention, the end section A of the production facility which continuously delivers tubes T is shown in FIG. 1.

The delivered tubes reach the machine C by way of a conveyor device B. At one transfer station 1, the tubes T are transferred to the receptacle 2 of the conveyor device, which transfers them to the machine C at the transfer station 3. The conveyor belt or the conveyor chain of the transport device, which is operated synchronously at the same rate that the production facility delivers and conveys the tubes, conveys the tubes T at the same speed to another transfer station 3 where the tubes or capsules are delivered to the machine C. Here, the tubes T reach a first transport carriage 4, also moved at the rate of the arriving tubes T, which after it has been filled is conveyed at a rapid speed to a delivery station 5. It stops there for a short time while a pusher 6, which is operated crosswise to the conveying direction of the conveyor belt or conveyor chain, pushes all tubes on the carriage 4 into a holding box 7 of a box-filling installation 8. Subsequently, the now empty carriage 4 is rapidly brought into the area of the transfer station 3 until it abuts the end of a second carriage 4' which is being loaded during the time the first carriage 4 requires for the trip to the delivery station, for unloading and return.

Continuous loading of respectively one of the two carriages 4 or 4' which follow each other is thus possible at the transfer station 3, along with discontinuous delivery of the tubes T to the box-filling station 8. Both carriages 4 and 4' are only schematically shown in FIG. 1. At that time the carriage 4 is at the transfer station 3, being loaded, the carriage 4' has already moved to the delivery station 5, where it is being unloaded. For the sake of clarity, only one carriage 4 is shown in FIGS. 2 and 3, since the distance between the two carriages continuously varies during operation of the machine.

The carriages are advantageously of such a size that they can accept a number of tubes T which take up a complete layer in the box 6. The box-filling installation is embodied in such a way that the box 6 is lowered by one layer after each unloading operation of a carriage 4 or 4'.

Figure 2:
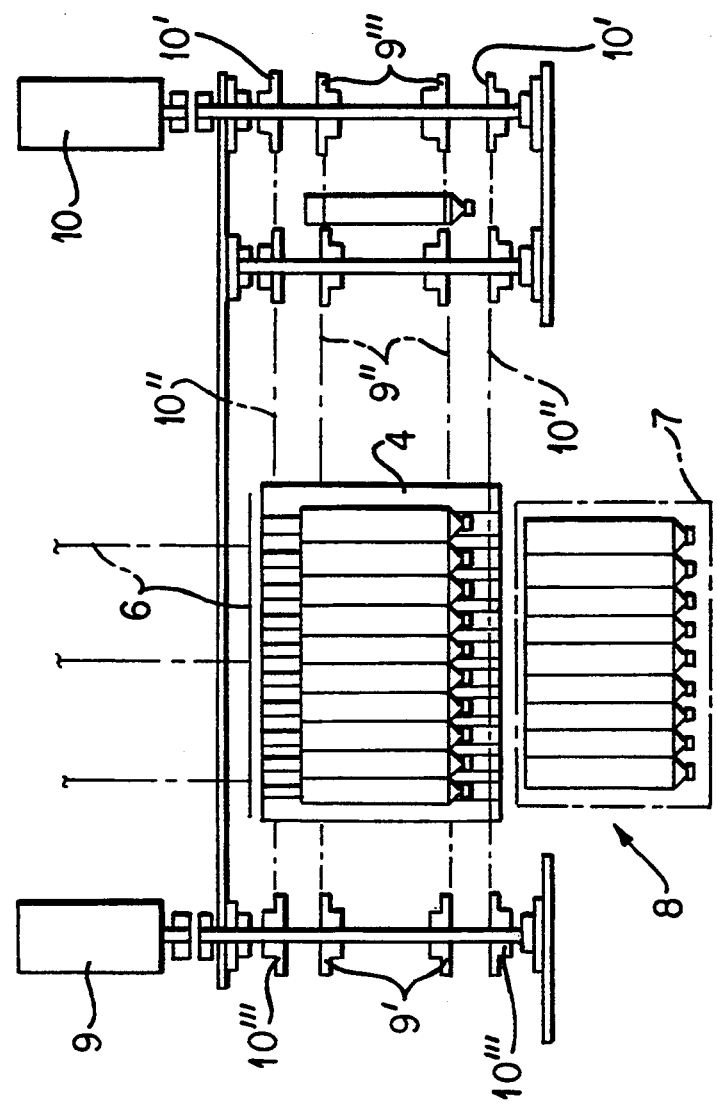
FIG. 2 is a schematic top view of the machine, according to one preferred embodiment of this invention.
Figure 3:
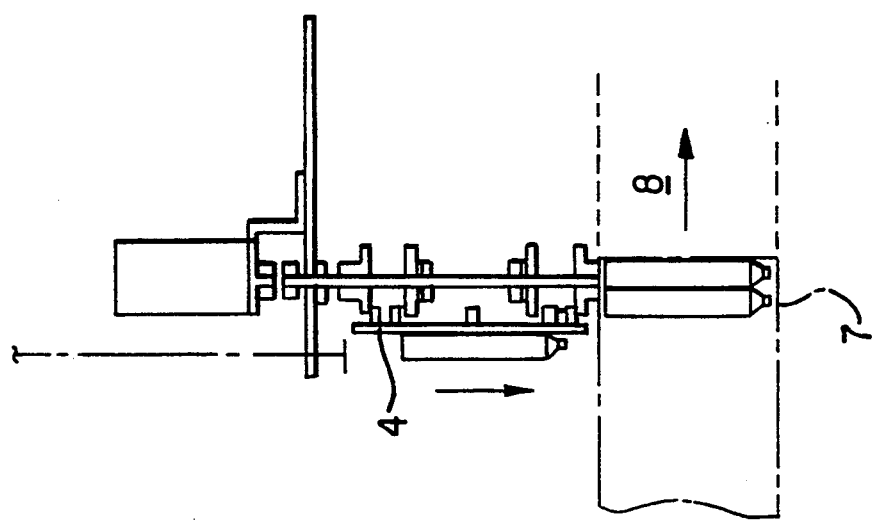
FIG. 3 is a schematic side view of a portion of the same machine.

An individual drive with an electronically controlled electric step motor 9 or 10, as shown in FIG. 2, is provided for each one of the two carriages 4, 4'. In this embodiment, for example, the drive motor 10 operates the first carriage 4 by two chain wheels 10' driving two parallel extending chains 10''. The chains are reversed by wheels 10''' which are positioned on the shaft of the drive 9. The carriage is preferably embodied so that it can follow the reversing movement of the chains. The second carriage, not shown, is driven in the same manner by the motor 9' by means of the chains 9''.

Figure 4:
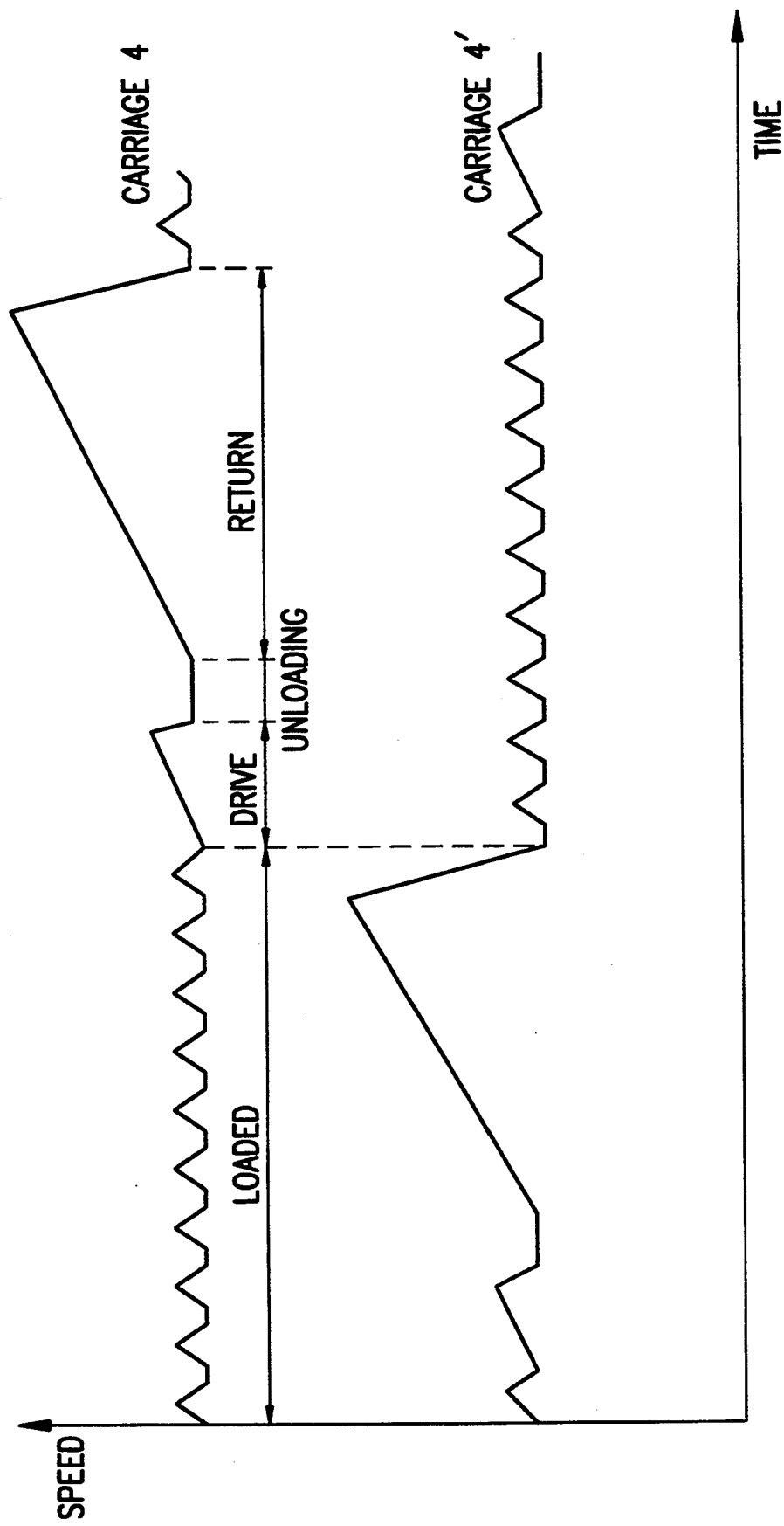
FIG. 4 is a graph which illustrates the movement over time of the two carriages.

The movement of the two carriages 4, 4' in relation to each other over time is illustrated in FIG. 4. The y-axis indicates the speed of movement. It should be well noted that the respective distance between the two carriages can only be indirectly inferred from the diagram by the driving time and speed.

The distance X shown in FIG. 1 can be relatively short, because it is possible that a loaded carriage has moved completely or partially to the delivery station 5. The driving time of a loaded carriage to the delivery station and the unloading time are relatively short, so that the unloaded carriage has a relatively large amount of time for the return trip to connect with the carriage which is being loaded.

It should also be noted that, if space considerations permit and the transfer station 1 at the end section A of the production facility is at the correct height above the floor, the machine C can accept the products directly. It is possible to place the machine at a lower level so that it can accept products directly at the transfer station 1. In this preferred embodiment, no conveyor device B is needed, which makes the entire installation less expensive.

Control of the carriage or its drive motor in the delivery areas is provided as a function of the arriving capsules or tubes. For this reason, the delivery area is preferably monitored opto-electronically, so that the carriage stops in case of a loss of production or when an empty receptacle 2 arrives or if a tube or capsule has been removed because of a production error. Otherwise the machine would run empty or empty spaces would occur in the box.

I claim:

1. In a method for accepting continuously supplied products (T) from a production facility (A) and respectively discontinuous delivery of a number of the products (T) at a transfer station (1, 3), the improvement comprising: filling a first transport carriage (4) moving in steps with the products (T) at the transfer station (1, 3) where a second transport carriage (4') directly abuts the first transport carriage (4); moving the second transport carriage (4') in steps and filling the second transport carriage (4') with the products (T); during a period of time required for filling the second carriage (4') moving the first carriage (4) to a delivery station (5); stopping the first transport carriage (4) during an unloading process; pushing off the products (T) from the first transport carriage (4) which is stopped at the delivery station (5) with a pusher (6) which is moved back and forth crosswise to an endless belt; and subsequently moving the first transport carriage (4) until the first carriage (4) abuts the second transport carriage (4') which is being filled.

2. In a method in accordance with claim 1, wherein the first transport carriage (4) and the second transport carriage (4') are moved along an endless belt and are each individually driven by a drive device (9, 10).

3. In a method in accordance with claim 1 wherein during packaging the products (T), which are continuously supplied by a production facility, in boxes (7) at a boxfilling installation (8), each of the boxes (7) is positioned at the delivery station (5) of the box-filling installation (8), into which a pusher (6) pushes a layer of the products (T), and the boxes (7) are lowered by a height of the layer after the layer has been pushed in.

4. In a method in accordance with claim 3, wherein an intermediate transport installation (B) is positioned downline form the transfer station (1) and conveys the products (T) from the transfer station (1) of the production facility to the transfer station (3) of the box-filling installation (8).

5. In a machine for accepting continuously supplied products (T) from a production facility (A) and respectively discontinuous delivery of a number of the products (T) at a transfer station (1, 3), the improvement comprising two parallel extending, coplanar, endless chain drives (9'', 10'') each having an individual drive device (9, 10) which conveys a corresponding transport carriage (4, 4').

6. A machine in accordance with claim 5, wherein the drive devices (9, 10) are driven by a programmable computer controlled electric motor.

7. A machine in accordance with claim 5, wherein the transport carriages (4, 4') comprise articulated elements, and a plurality of rigid carriage guide tracks are positioned at least in an area of the transfer station (1, 3) and in an area of a delivery station.

* * * * *